(12) United States Patent
Kurabayashi et al.

(10) Patent No.: US 11,481,546 B2
(45) Date of Patent: Oct. 25, 2022

(54) SCREEN DISCRIMINATION APPARATUS, SCREEN DISCRIMINATION METHOD AND PROGRAM

(71) Applicant: NIPPON TELEGRAPH AND TELEPHONE CORPORATION, Tokyo (JP)

(72) Inventors: Toshiyuki Kurabayashi, Tokyo (JP); Haruto Tanno, Tokyo (JP); Muneyoshi Iyama, Tokyo (JP); Hiroyuki Kirinuki, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 43 days.

(21) Appl. No.: 17/057,041

(22) PCT Filed: May 13, 2019

(86) PCT No.: PCT/JP2019/018866
§ 371 (c)(1),
(2) Date: Nov. 19, 2020

(87) PCT Pub. No.: WO2019/225366
PCT Pub. Date: Nov. 28, 2019

(65) Prior Publication Data
US 2021/0117616 A1    Apr. 22, 2021

(30) Foreign Application Priority Data
May 23, 2018 (JP) ............................. JP2018-098710

(51) Int. Cl.
*G06F 40/194* (2020.01)
*G06F 40/14* (2020.01)
(Continued)

(52) U.S. Cl.
CPC .............. *G06F 40/194* (2020.01); *G06F 8/65* (2013.01); *G06F 11/3688* (2013.01); *G06F 40/14* (2020.01)

(58) Field of Classification Search
CPC .......... G06F 40/194; G06F 40/14; G06F 8/65; G06F 11/3688
(Continued)

(56) References Cited

U.S. PATENT DOCUMENTS 10,671,367 B2 * 6/2020 Matthews ................. G06F 8/38

OTHER PUBLICATIONS

Kurabayashi et al. (2017) "Automatically Generating Test Scripts for GUI Testing," Software Engineering Symposium pp. 260-264.
(Continued)

*Primary Examiner* — Chuck O Kendall

(57) ABSTRACT

A screen discrimination device includes: a determination section which executes an automatic operation of a displayed screen of an application to cause screen transition to occur, and determines whether or not each screen at a transition destination is different from each post-transition screen based on a predetermined method; a reception section which outputs a result of the determination of whether or not each screen at the transition destination is different from each post-transition screen, and receives input of a condition for identifying a screen serving as a correction target based on the result of the determination; and a re-determination section which re-executes the automatic operation of the displayed screen of the application to cause the screen transition to occur, determines whether or not each screen at the transition destination meets the condition and, in a case where a first screen meeting the condition is present, when the post-transition screen includes a second screen meeting the condition, determines that the first screen and the second screen are identical to each other, whereby it becomes
(Continued)

possible to correct an error in the discrimination of screen identity with a small amount of operation.

20 Claims, 13 Drawing Sheets

(51) Int. Cl.
  *G06F 8/65* (2018.01)
  *G06F 11/36* (2006.01)
  *G06F 9/44* (2018.01)
(58) Field of Classification Search
  USPC .......................................... 717/105, 109, 113
  See application file for complete search history.

(56) References Cited

OTHER PUBLICATIONS

Philip Bille (2005) "A Survey on Tree Edit Distance and Related Problems," Theoretical Computer Science 337:1-3, pp. 217-239.

* cited by examiner

SCREEN DISCRIMINATION APPARATUS, SCREEN DISCRIMINATION METHOD AND PROGRAM

CROSS-REFERENCE TO RELATED APPLICATIONS

This application is a U.S. 371 Application of International Patent Application No. PCT/JP2019/018866, filed on 13 May 2019, which application claims priority to and the benefit of JP Application No. 2018-098710, filed on 23 May 2018, the disclosures of which are hereby incorporated herein by reference in their entireties.

TECHNICAL FIELD

The present invention relates to a screen discrimination device, a screen discrimination method, and a program.

BACKGROUND ART

In recent years, in order to quickly provide services meeting needs, a development style which provides services at short intervals is increased and, with the increase, the frequency of a software test is increased. In such circumstances, in a Web application, a problem arises in that a screen transition test in functional tests requires a certain amount of operation. Herein, the screen transition test in the functional tests is defined as, among the functional tests, "a test for a function capable of determining whether or not implementation is performed as specified from a screen displayed on a client side in response to an interaction from the client side". A reason why the screen transition test in the functional tests requires a certain amount of operation is that, as the interaction from the client side, operations by a person such as clicking a link or a button on the screen and inputting a proper value in a form are required.

As a method for automating such a screen transition test to reduce the amount of operation, a method in which the screen transition test is automatically executed by describing a test case with a script is widely known. However, creation of the test case requires a certain amount of operation, and hence there is a possibility that the amount of operation generated by scripting is not offset in the case where the same test is not repeatedly performed or the case where existing function is modified and it becomes impossible to use a test script, and it is difficult to determine whether or not scripting is to be executed. In order to solve such a problem, there is a reverse base test script automatic generation technique (hereinafter referred to as "a reverse base test technique") which analyzes a test target to restore specification information and automatically generates the test script from the restored specification information (NPL 1).

In the reverse base test technique, a test is automatically generated based on the specification information which is automatically restored from the test target. However, it is technically difficult to restore the specification information completely, and hence the restoration of the complete specification information and the test generation are implemented by obtaining a part which is not restored through the instruction of a user. Specifically, screen transition information serving as the test target is gradually restored while a search is actually performed by automatically operating a Web application (hereinafter referred to as "dynamic analysis"). Subsequently, based on the restored information, a screen transition diagram (specification information) and a test script associated with screen transition on the diagram are generated. The screen transition which has not be restored (the screen transition which has not been reached during the search) is shown on the screen transition diagram, and hence the user observes the screen transition and manually creates a script for implementing the screen transition, the script is given to the reverse base test technique as input, and the specification information is complemented by re-executing the reverse base test technique (hereinafter referred to as "a specification information assistance method by script creation").

During the dynamic analysis, it is necessary to discriminate whether or not the screen which has been reached is the screen which transitioned in the past. However, in general, a unit which is one screen when the screen transition test is performed is heuristically determined and the specific definition thereof does not exist, and hence it is difficult to perform the discrimination automatically with a machine.

For example, suppose that, in a test of a search site, the test is performed with a screen with a search result and a screen without the search result which are used as two different screens. In this case, there is a Web application having the same URL in the case where the search result is present and in the case where the search result is not present, and it is not always possible to discriminate between the cases with the URL. To cope with this, it is conceivable to use Diff command (a method for extracting a difference) between an HTML file in the case where the search result is present and an HTML file in the case where the search result is not present. However, in this case, screens are discriminated to be different screens when the search result differs even slightly, and hence, in the case where the search result is present, when search terms are different, the screens of the terms are discriminated to be different screens.

In order to solve the above problem, in a screen comparison technique which uses Tree Edit Distance (NPL 2), the degree of similarity between screens is defined by using the number of times of each of deletion and insertion when the deletion and insertion of nodes are performed until DOM trees of HTMLs of screens to be compared with each other coincide with each other, the number of times is provided with a threshold, and it is discriminated whether or not the screens are identical to each other. However, an appropriate threshold differs from one test target to another, and hence it is difficult to perform an accurate screen discrimination. For example, in a test target having an element which changes every time the test target is accessed such as an advertisement, the threshold should be set to a high value. However, in the case where the threshold is extremely high, it becomes increasingly likely to determine that different screens are identical to each other.

In view of the foregoing, it can be said that it is difficult to accurately perform the screen discrimination during the dynamic analysis in the reverse base test technique.

CITATION LIST

Non Patent Literature

[NPL 1] "Automatic Test Script Generation on GUI testing", Kurabayashi Toshiyuki, Iyama Soukichi, Kirinuki Hiroyuki, Tannno Haruto, IPSJ/SIGSE Software Engineering Symposium 2017 collection pp. 260-264, September 2017.

[NPL 2] "A survey on tree edit distance and related problems", Philip Bille. 2004. Theoretical Computer Science. Volume 337, Issues 1-3, 9 Jun. 2005, Pages 217-239.

SUMMARY OF THE INVENTION

Technical Problem

In the case where an error is present in the screen discrimination during the dynamic analysis, a deficiency or a mistake occurs in the specification information restored by the reverse base test technique. In the case where the deficiency or the mistake is present in the specification information, a user is required to correct the deficiency or the mistake. However, the conventional specification information assistance method by script creation has a problem in which it is not possible to complement the deficiency or the mistake in the specification information caused by the error in the screen discrimination during the dynamic analysis.

A pattern of the error in the screen discrimination includes the following two patterns, and a reason why the problem occurs will be explained for each pattern.
the case where different screens are discriminated to be identical to each other
the case where identical screens are discriminated to be different from each other
With regard to each of the above two patterns, a description will be given of a reason why the specification information assistance method by script creation ceases to function properly by using a test target having screen transition shown in FIG. 1 as an example.

[The Case where Different Screens are Discriminated to be Identical to Each Other]

In the test target in FIG. 1, in the case where a screen B and a screen C are discriminated to be identical to each other, restored specification information is as shown in FIG. 2. In FIG. 2, specification information of a transition from a screen A to the screen C is missing. This is because, even in the case where the screen has transitioned to the screen C during the dynamic analysis, it is discriminated that the screen has transitioned to the screen B, and hence the transition to the screen C is not recognized. In such a case, even when the script for the transition from the screen A to the screen C is created to use the specification information assistance method by script generation, it is not possible to complement the specification information. This is because screen discrimination capability in the dynamic analysis does not change, and hence, even when the screen C is reached using the created script, the screen C is discriminated to be identical to the screen B in the dynamic analysis.

[The Case where Identical Screens are Determined to be Different from Each Other]

In the test target in FIG. 1, in the case where the screen B is discriminated to be a different screen every time the screen B is accessed during the dynamic analysis, restored specification information is as shown in FIG. 3. In FIG. 3, a plurality of transitions from the screen A to the screen B are present independently of each other. This is because the screen B is discriminated to be another screen every time the screen transitions to the screen B during the dynamic analysis. However, the specification information assistance method by script creation is a method for complementing deficient specification information, and hence it is not possible to correct redundant specification information.

In order to solve the present problem, it is conceivable to use a method for improving accuracy of the screen discrimination. However, the definition of screen identity is obscure in the first place and, in general, the discrimination is heuristically performed. Accordingly, it is extremely difficult to discriminate the screen with an accuracy of 100% using a machine, and it is difficult to solve the present problem even when the accuracy of the screen discrimination is improved.

The present invention is achieved in view of the above points, and an object thereof is to allow correction of an error in the discrimination of screen identity with a small amount of operation.

Means for Solving the Problem

In order to solve the above problem, a screen discrimination device includes: a determination section which executes an automatic operation of a displayed screen of an application to cause screen transition to occur, and determines whether or not each screen at a transition destination is different from each post-transition screen based on a predetermined method; a reception section which outputs a result of the determination of whether or not each screen at the transition destination is different from each post-transition screen, and receives input of a condition for identifying a screen serving as a correction target based on the result of the determination; and a re-determination section which re-executes the automatic operation of the displayed screen of the application to cause the screen transition to occur, determines whether or not each screen at the transition destination meets the condition and, in a case where a first screen meeting the condition is present, when the post-transition screen includes a second screen meeting the condition, determines that the first screen and the second screen are identical to each other.

Effects of the Invention

It is possible to correct an error in the discrimination of screen identity with a small amount of operation.

DESCRIPTION OF EMBODIMENTS

Figure 1:
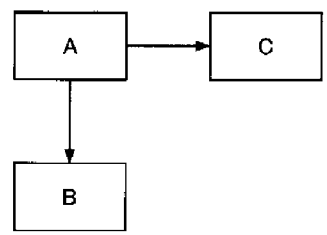
FIG. 1 is a view showing an example of screen transition in specifications of a test target.
Figure 2:
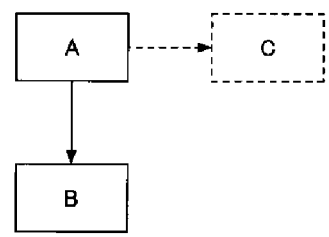
FIG. 2 is a view showing specification information which is restored in the case where different screens are discriminated to be identical to each other.
Figure 3:
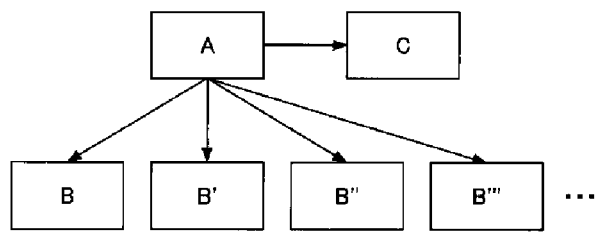
FIG. 3 is a view showing specification information which is restored in the case where identical screens are determined to be different from each other.
Figure 4:
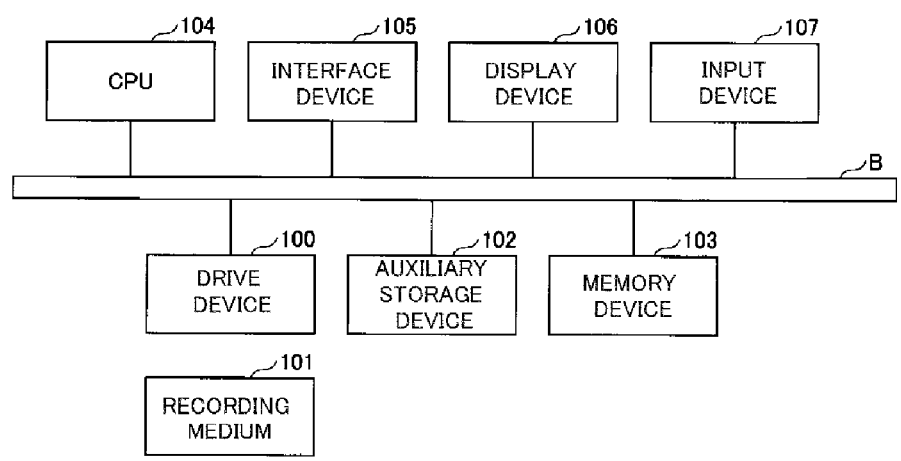
FIG. 4 is a view showing an example of the hardware configuration of a specification analysis device 10 in an embodiment of the present invention.

Hereinbelow, an embodiment of the present invention will be described based on the drawings. FIG. 4 is a view showing an example of the hardware configuration of a specification analysis device 10 in the embodiment of the present invention. The specification analysis device 10 in FIG. 4 has a drive device 100, an auxiliary storage device 102, a memory device 103, a CPU 104, an interface device 105, a display device 106, and an input device 107 which are connected to each other via a bus B.

A program which implements processing in the specification analysis device 10 is provided by a recording medium 101 such as a CD-ROM or the like. When the recording medium 101 in which the program is stored is set in the drive device 100, the program is installed in the auxiliary storage device 102 from the recording medium 101 via the drive device 100. However, the installation of the program does not necessarily need to be performed from the recording medium 101, and the program may also be downloaded from another computer via a network. The auxiliary storage device 102 stores the installed program, and required files, data, and the like.

The memory device 103 reads the program from the auxiliary storage device 102 and stores the program in the case where an activation instruction of the program is issued. The CPU 104 implements functions related to the specification analysis device 10 according to the program stored in the memory device 103. The interface device 105 is used as an interface for connection to the network. The display device 106 displays a GUI (Graphical User Interface) by the program or the like. The input device 107 is constituted by a keyboard and a mouse, and is used for inputting various operation instructions.

Figure 5:
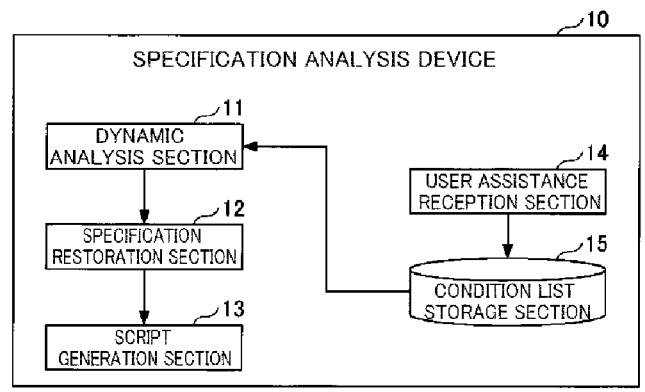
FIG. 5 is a view showing an example of the functional configuration of the specification analysis device 10 in the embodiment of the present invention.

FIG. 5 is a view showing an example of the functional configuration of the specification analysis device 10 in the embodiment of the present invention. In FIG. 5, the specification analysis device 10 has a dynamic analysis section 11, a specification restoration section 12, a script generation section 13, and a user assistance reception section 14. These sections are implemented by processing which one or more programs installed in the specification analysis device 10 cause the CPU 104 to execute. In addition, the specification analysis device 10 uses a condition list storage section 15. The condition list storage section 15 can be implemented by using, e.g., the memory device 103 or the auxiliary storage device 102, or a storage device which can be connected to the specification analysis device 10 via the network.

The dynamic analysis section 11 performs dynamic analysis on a Web application serving as a test target (hereinafter referred to as "a target application"). Specifically, the dynamic analysis section 11 executes an automatic operation of a displayed screen of the target application to cause screen transition to occur, and determines whether or not each screen at a transition destination is different from each post-transition screen based on a predetermined method (known screen discrimination technique).

The specification restoration section 12 restores specification information (screen transition diagram) of the target application based on the screen transition obtained by the dynamic analysis section 11. At this point, the specification restoration section 12 restores the specification information such that a user can grasp the result of the determination of whether or not the screens are different from each other.

The script generation section 13 generates a test script based on the specification information restored by the specification restoration section 12.

The user assistance reception section 14 outputs (e.g., displays) the specification information restored by the specification restoration section 12, and receives input of correction of the specification information from the user. In particular, in the case where correction of the result of the determination of whether or not the screens are different from each other is present, the user assistance reception section 14 receives input of a condition for identifying the screen which serves as a correction target based on the determination result (hereinafter referred to as "a screen identification condition") from the user. The user assistance reception section 14 stores the received screen identification condition in the condition list storage section 15.

In the case where the user assistance reception section 14 receives the correction of the specification information, each of the dynamic analysis section 11, the specification restoration section 12, and the script generation section 13 re-executes its processing. In the re-execution, the dynamic analysis section 11 determines whether or not the screens are different from each other by a method different from the above predetermined method. Specifically, the dynamic analysis section 11 determines whether or not, in the screen transition obtained by the re-execution, each screen at the transition destination meets the screen identification condition stored in the condition list storage section 15 and, in the case where a first screen which meets the screen identification condition is present, when the post-transition screens include a second screen which meets the screen identification condition, the dynamic analysis section 11 determines that the first screen and the second screen are identical to each other. That is, the result of the determination of screen identity by the dynamic analysis section 11 is corrected based on the screen identification condition.

Figure 6:
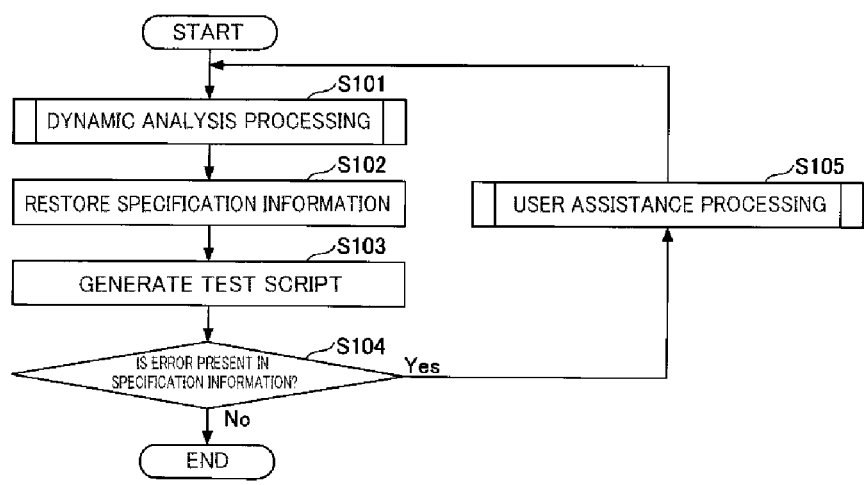
FIG. 6 is a flowchart for explaining an example of a processing procedure executed by the specification analysis device 10.

Hereinbelow, a description will be given of a processing procedure executed by the specification analysis device 10. FIG. 6 is a flowchart for explaining an example of the processing procedure executed by the specification analysis device 10.

In Step S101, the dynamic analysis section 11 executes dynamic analysis processing on the target application. In the dynamic analysis processing, the screen of the target application is actually automatically operated and the screen transition is thereby caused to occur, and a search for the screen at the transition destination is recursively performed. At this point, identity between the screen at the transition destination and the post-transition screen is determined.

Subsequently, the specification restoration section 12 restores (generates) specification information (screen transition diagram) related to the target application based on the screen transition grasped in the dynamic analysis processing (S102). In the present embodiment, suppose that the specification information shown in FIG. 7 is correct specification information.

Figure 7:
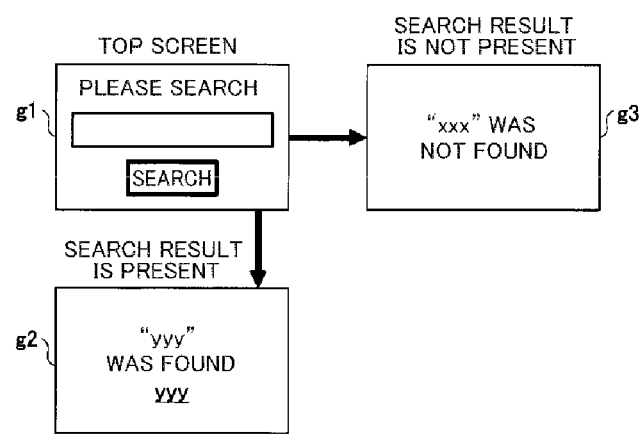
FIG. 7 is a view showing correct specification information related to a target application of the present embodiment.

FIG. 7 is a view showing correct specification information related to the target application of the present embodiment. FIG. 7 shows specification information of an example in which the target application is a search site. In this case, the target application performs a search with a term input on a screen g1 serving as a top screen and, when a search result corresponding to the term is present, the target application generates a screen g2 showing the presence of the search result and, when the search result corresponding to the term is not present, the target application generates a screen g3 which shows the absence of the search result.

Figure 8:
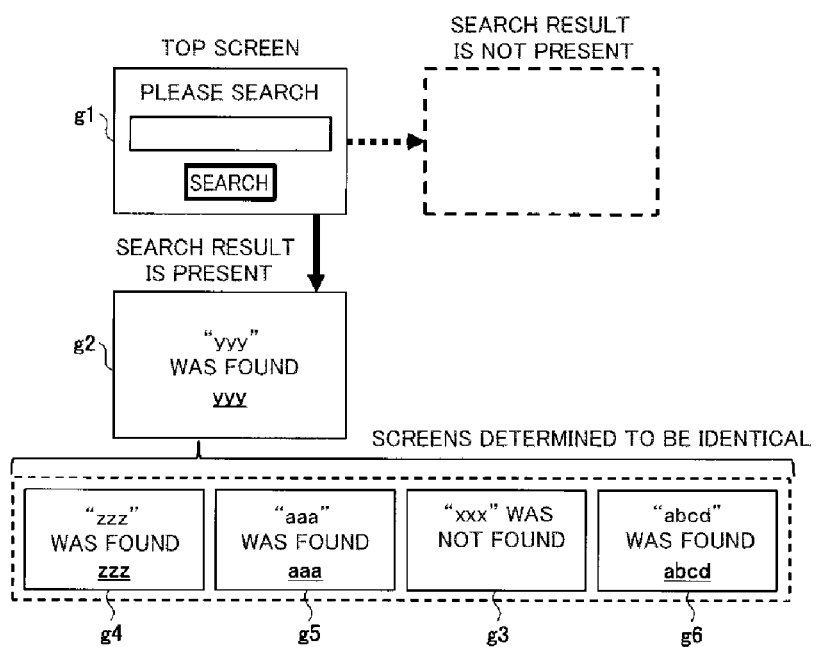
FIG. 8 is an example of specification information in the case where screens to be discriminated to be different from each other are discriminated to be identical to each other.

In Step S101, in the case where screens to be discriminated to be different from each other (e.g., the screen g2 and the screen g3) are discriminated to be identical to each other, specification information restored in Step S102 is, e.g., as shown in FIG. 8.

FIG. 8 is an example of specification information in the case where screens to be discriminated to be different from each other are discriminated to be identical to each other. In FIG. 8, the screen g3 is determined to be identical to the screen g2. In other words, the screen in the case where the search result is present and the screen in the case where the search result is not present are not distinguished from each other. As a result, the screen transition in the case where the search result is not present is not restored. Note that, in the present embodiment, each of screens g4, g5, g3, and g6, which is determined to be identical to the screen g2, is not integrated into the screen g2, and is included in the specification information independently of the screen g2 such that it can be seen that each of the screens g4, g5, g3, and g6 is determined to be identical to the screen g2. That is, the determination that each of the screens g4, g5, g3, and g6 is identical to the screen g2 is expressed by disposing the screens g4, g5, g3, and g6 below the screen g2.

Figure 9:
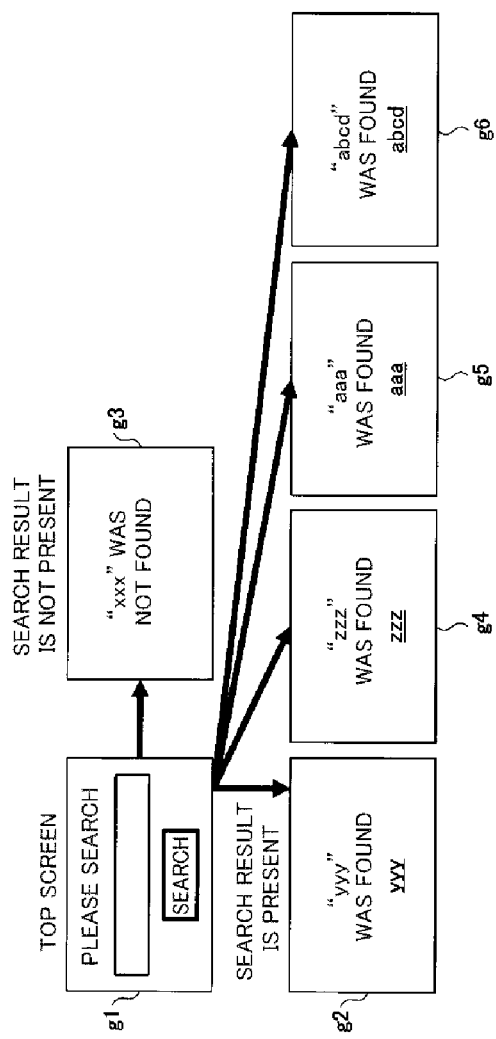
FIG. 9 is an example of specification information in the case where screens to be discriminated to be identical to each other are discriminated to be different from each other.

In addition, in Step S101, in the case where screens to be discriminated to be identical to each other are discriminated to be different from each other, specification information restored in Step S102 is, e.g., as shown in FIG. 9.

FIG. 9 is an example of specification information in the case where screens to be discriminated to be identical to each other are discriminated to be different from each other. In FIG. 9, each of the screens g4, g5, and g6 is the screen in the case where the search result is present, and as a test of the target application, each of the screens g4, g5, and g6 should be discriminated to be identical to the screen g2. However, when each of the screens g4, g5, and g6 is determined to be different from the screen g2 in the dynamic analysis processing in Step S101, the screen transition to each screen is restored.

Subsequently, the script generation section 13 generates a test script based on the result of the dynamic analysis processing (S103). The generation of the test script based on the result of the dynamic analysis may be appropriately performed by using a known technique. Note that an operation command to each screen is described in the test script such that each screen transition indicated by specification information is implemented.

Subsequently, the user assistance reception section 14 receives input of a determination result by the user which is the result of the determination of whether or not an error is present in the specification information restored in Step S102 (hereinafter referred to as "restored specification information") (S104). For example, the user assistance reception section 14 displays an inquiry screen including the restored specification information and a button or the like for receiving the presence or absence of the error in the restored specification information from the user in the display device 106. The user refers to the restored specification information included in the inquiry screen to determine the presence or absence of the error. In the case where the error is not present in the restored specification information, the user performs input indicative of the absence of the error on the inquiry screen. In this case (No in S104), the processing procedure in FIG. 6 is ended.

On the other hand, in the case where the error is present in the restored specification information, the user performs input indicative of the presence of the error on the inquiry screen. In this case (Yes in S104), the user assistance reception section 14 executes user assistance processing (S105). In the user assistance processing, the user assistance reception section 14 receives input of the screen identification condition for identifying the screen of which the result of the determination of whether or not the screens are different from each other is to be corrected from the user. The input screen identification condition is stored in the condition list storage section 15.

Subsequently, the processing procedure in and after Step S101 is re-executed. At this point, in the dynamic analysis processing in Step S101, based on the screen identification condition stored in the condition list storage section 15 in Step S105, the determination of screen identity is complemented. As a result, in Step S102, the specification information different from that in the previous dynamic analysis processing is restored. Subsequently, the processing procedure in and after Step S103 is executed and, when the error is eliminated in the restored specification information (No in S104), the processing procedure in FIG. 6 is ended.

Figure 10:
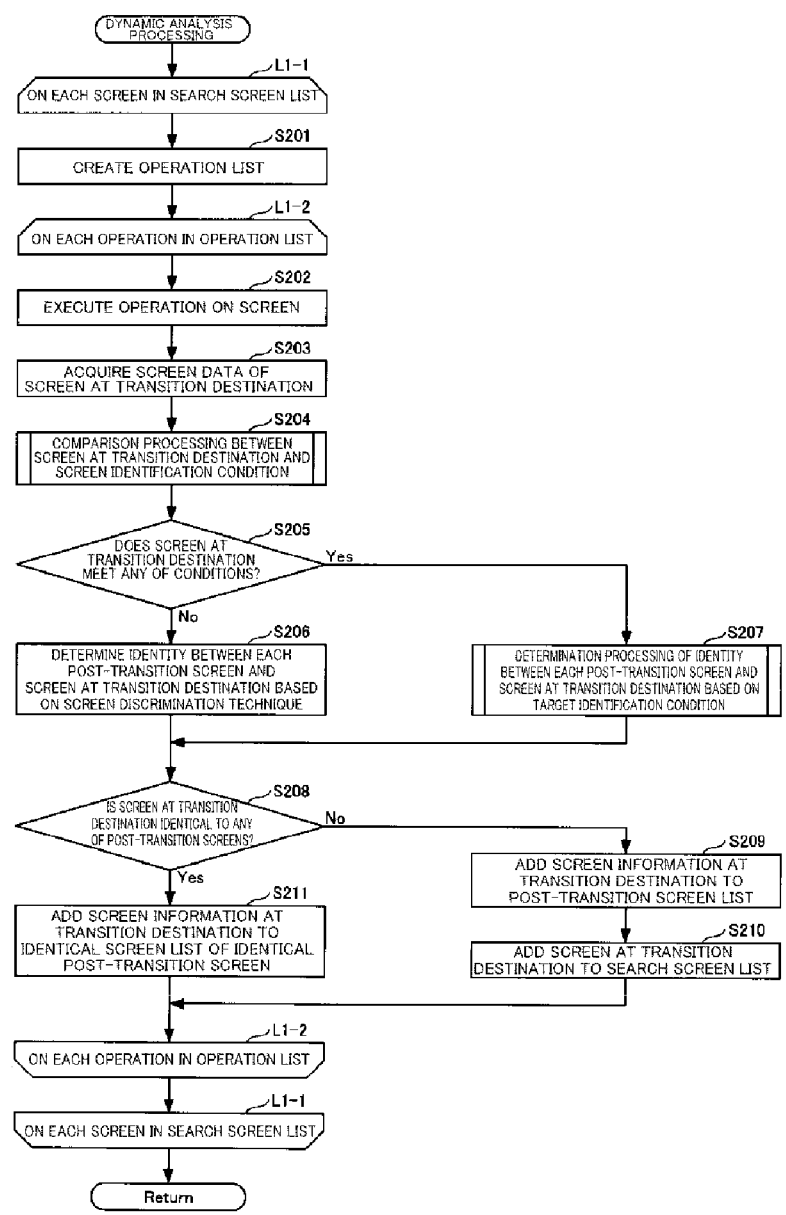
FIG. 10 is a flowchart for explaining an example of a processing procedure of dynamic analysis processing.

Subsequently, the detail of S101 will be described. FIG. 10 is a flowchart for explaining an example of the processing procedure of the dynamic analysis processing.

In the processing procedure in FIG. 10, in each Step surrounded by Loop L1-1, processing is executed on each screen included in a search screen list. Hereinafter, a screen serving as a processing target in Loop L1-1 is referred to as "a target screen". Note that, in the search screen list, in its initial state, screen data (HTML or the like) of one screen acquired by accessing an initial URL by the dynamic analysis section 11 is included. The initial URL is, e.g., a URL of a screen serving as a starting point in the screen transition of the target application, and is specified by the user. In the present embodiment, the URL of the screen g1 serving as the top screen in FIG. 7 is the initial URL.

In Step S201, the dynamic analysis section 11 creates an operation list for the target screen. For example, a list having, as one element, information (hereinafter referred to as "operation information") indicative of an operation content of each locater of a screen element (a link or a submit button) which causes the transition of the screen to occur on the target screen is generated as the operation list. The operation is an operation such as a click or the like. The locater is identification information of the screen element serving as an operation target. Specifically, in the case where the target screen is the screen g1 (FIG. 7), a plurality of values are generated as input values to the screen g1, and the operation information indicative of the click of a search button is generated for each input value. That is, the operation information is generated such that the operation differs from one input value to another.

Subsequently, the dynamic analysis section 11 executes Loop L1-2 for each element (operation information) in the operation list. Among elements in the operation list, an element serving as a processing target in Loop L1-2 is referred to as "target operation information".

In Step S202, the dynamic analysis section 11 automatically executes an operation indicated by the target operation information on the target screen. For example, when the target screen is the screen g1, the input value of the target operation information is input to the screen g1, and the search button is clicked. As a result, the screen transition occurs, and the dynamic analysis section 11 acquires screen data of the screen at the transition destination downloaded from the target application (S203).

Subsequently, the dynamic analysis section 11 executes comparison processing between the screen at the transition destination and the screen identification condition (S204). That is, it is determined whether or not the screen data of the screen at the transition destination meets any of the screen identification conditions. Note that the screen identification condition is information which is input by the user in Step S105 in FIG. 6 and is stored in the condition list storage section 15. Accordingly, in the case where one or more screen identification conditions are not stored in the condition list storage section 15, Step S204 may not be executed.

In the case where there is no screen identification condition or the case where the screen data of the screen at the transition destination does not meet any screen identification condition (No in S205), the dynamic analysis section 11 determines the identity (difference) between each screen of which screen information is included in a post-transition screen list (hereinafter referred to as "a post-transition screen") and the screen at the transition destination by using a known screen discrimination technique (S206). The post-transition screen list is a list which has, as an element, the screen information of the screen which has already transitioned in the dynamic analysis processing, and is empty when FIG. 10 is started. Note that the screen information is information including the screen data (HTML or the like) and identification information of the screen at a transition source of the screen related to the screen data.

On the other hand, in the case when the screen at the transition destination meets any of the screen identification conditions (hereinafter referred to as "a target identification condition") (Yes in S205), the dynamic analysis section 11 determines the identity (difference) between each post-transition screen of which the screen information is included in the post-transition screen list and the screen at the transition destination based on the target identification condition (S207). In this case, by determining whether or not the post-transition screen includes the screen which meets the target identification condition, the identity between the screen at the transition destination and each post-transition screen is determined. That is, the post-transition screen which meets the target identification condition is determined to be identical to the screen at the transition destination. Note that the detail of Step S207 will be described later.

Subsequently to Step S206 or S207, the dynamic analysis section 11 causes the processing to branch based on the determination result of Step S206 or S207 (S208). That is, in the case where the screen at the transition destination is determined to be different from any of the post-transition screens in Step S206 or S207 (No in S208), the dynamic analysis section 11 adds the screen information of the screen at the transition destination to the post-transition screen list (S209). Subsequently, the dynamic analysis section 11 adds the screen data of the screen at the transition destination to the search screen list (S210). Consequently, the screen at the transition destination serves as the processing target in subsequent Loop in Loop L1-1.

On the other hand, in Step S206 or S207, in the case where the screen at the transition destination is determined to be identical to any of the post-transition screens (hereinafter referred to as "an identical post-transition screen") (Yes in S208), the dynamic analysis section 11 adds the screen information of the screen at the transition destination to an identical screen list of the identical post-transition screen (S211). The identical screen list is a list which is associated with each post-transition screen and stores the screen information of the screen which is determined to be identical to the post-transition screen.

When Loop L1-2 performed on each element included in the operation list for the target screen is ended, the screen data which is not the processing target in the search screen list serves as the processing target, and Loop L1-1 is executed. When the screen data which is not the processing target no longer exists in the search screen list, the processing procedure in FIG. 10 is ended.

Note that, in Step S102 in FIG. 6, the specification information (screen transition diagram) is restored (generated) based on the post-transition screen list, the identical screen list of each post-transition screen, and the like. For example, FIG. 8 is an example of the specification information which is restored in the case where the screen information of each of the screens g4, g5, g3, and g6 is included in the identical screen list of the screen g2. On the other hand, FIG. 9 is an example of the specification information which is restored in the case where the identical screen list of each screen is empty.

Figure 11:
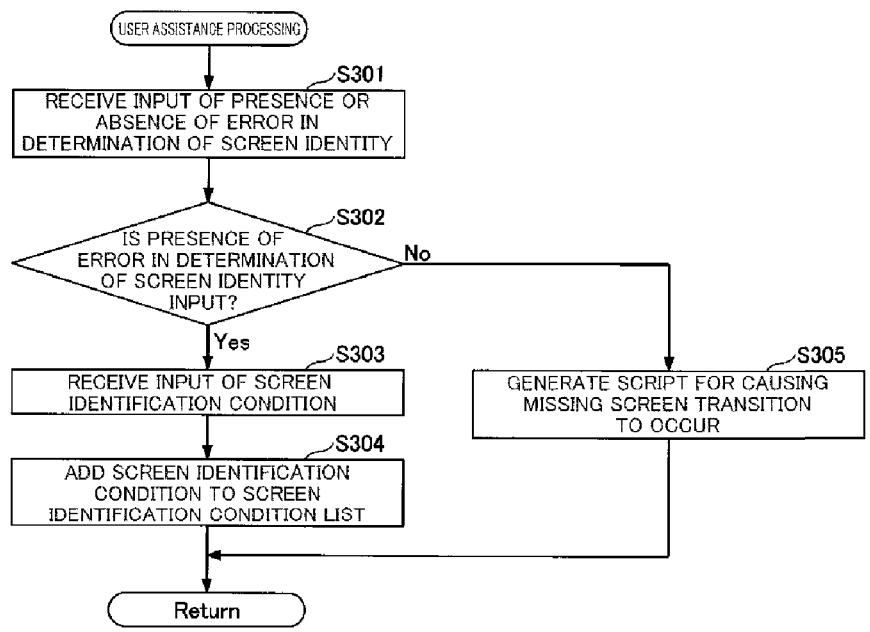
FIG. 11 is a flowchart for explaining an example of a processing procedure of user assistance processing.

Subsequently, the detail of Step S105 in FIG. 6 will be described. FIG. 11 is a flowchart for explaining an example of a processing procedure of user assistance processing.

In Step S301, the user assistance reception section 14 receives input of the presence or absence of the error in the determination of screen identity from the user. For example, the user assistance reception section 14 may display a screen for asking the user about the presence or absence of the error (hereinafter referred to as "an error inquiry screen") in the display device 106, and may receive the input of the presence or absence of the error in the determination of screen identity via the error inquiry screen.

In the case where the presence of the error in the determination of screen identity is input (Yes in S302), the user assistance reception section 14 receives input of the screen identification condition from the user (S303). The screen identification condition may be a condition based on various pieces of information such as a URL, a DOM structure, a title of a screen, and text included in a screen and is not limited to a specific condition and, in the present embodiment, a description will be given of an example in which the condition based on the title is used as the screen identification condition.

For example, in the case where the specification information shown in FIG. 8 is displayed, the user desires to correct the result of the determination of screen identity of the screen g3 (i.e., the user desires to cause the screen g3 to be determined to be different from the screen g2). Herein, a feature of the screen g3 which makes the screen g3 different from the screen g2 is its title which matches "was not found" according to backward matching. Accordingly, in this case, the user inputs that the title matches "was not found" according to backward matching as the screen identification condition. For example, the following assertion (hereinafter referred to as "an assertion a1") may be input as the screen identification condition such that a program for causing the CPU 104 to function as the dynamic analysis section 11 can easily interpret the condition. "Assert.That(driver.getTile( ), Does.EndWith("was not found"))"

The assertion a1 is the assertion which is described with NUnit. Herein, "driver.getTile( )" is a command for acquiring a title name. "Does.EndWith("was not found")" is a command for determining whether or not the acquired title name matches "was not found" according to backward matching. The assertion a1 returns "True" in the case where the result of the above determination is affirmative, and the assertion a1 returns "False" in the case where the result of the above determination is negative. Consequently, the dynamic analysis section 11 determines the screen identity by determining whether or not a character string "was not found" is present in the title of the screen as backward matching based on the assertion a1.

Alternatively, in the case where the specification information shown in FIG. 9 is displayed, the user desires to correct the result of the determination of screen identity of the screens g4, g5, and g6 (i.e., the user desires to cause each of the screens g4, g5, and g6 to be determined to be identical to the screen g2). Herein, a feature of each of the screens g4, g5, and g6 which is common to the screen g2 is its title which matches "was found" according to backward matching. Accordingly, in this case, the user inputs that the title matches "was found" according to backward matching as the screen identification condition. For example, the following assertion (hereinafter referred to as "an assertion a2") may be input as the screen identification condition such that the program for causing the CPU 104 to function as the dynamic analysis section 11 can easily interpret the condition. "Assert.That(driver.getTile( ), Does.EndWith("was found"))"

Similarly to the assertion a1, the assertion a2 is also described with NUnit. The assertion a2 returns "True" in the case where the title name acquired from the screen matches "was found" according to backward matching, and the assertion a2 returns "False" in the case where the title name does not match "was found" according to backward matching. Consequently, the dynamic analysis section 11 determines the screen identity by determining whether or not a character string "was found" is present in the title of the screen as backward matching based on the assertion a2.

Subsequently, the user assistance reception section 14 stores the screen identification condition input by the user in the condition list storage section 15 (S304).

On the other hand, in the case where the presence of the error in the determination of screen identity is not input (No in S302), the user assistance reception section 14 generates a script for causing missing screen transition to occur in response to the input by the user (S305). That is, in the case where the error is present in the screen transition diagram and the error is not related to the discrimination of screen identity, the error is caused by the presence of missing screen transition.

Figure 12:
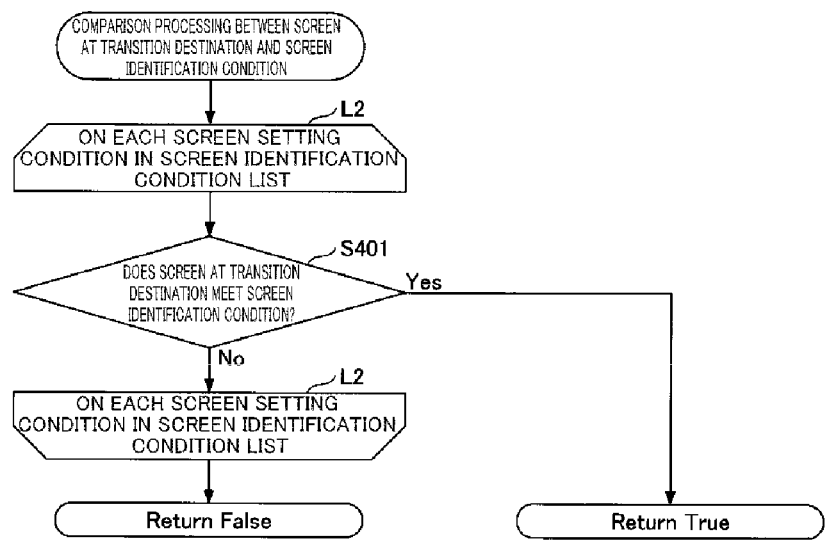
FIG. 12 is a flowchart for explaining an example of a processing procedure of comparison processing between a screen at a transition destination and a screen identification condition.

Subsequently, the detail of Step S204 in FIG. 10 will be described. FIG. 12 is a flowchart for explaining an example of a processing procedure of comparison processing between the screen at the transition destination and the screen identification condition. In FIG. 12, the individual screen identification conditions stored in the condition list storage section 15 in FIG. 11 serve as the processing targets successively one by one, and Loop L2 is executed. In Loop L2, Step S401 is executed.

In Step S401, the dynamic analysis section 11 determines whether or not the screen data of the screen at the transition destination meets the screen identification condition serving as the processing target. Specifically, the dynamic analysis section 11 executes the assertion serving as the target condition (e.g., the assertion a1 or the assertion a2), and determines whether or not the screen at the transition destination meets the screen identification condition based on a return value. That is, it is determined that the screen meets the screen identification condition when the return value of the assertion is True, and it is determined that the screen does not meet the screen identification condition when the return value of the assertion is False.

In the case where the screen at the transition destination meets the screen identification condition (Yes in S401), the dynamic analysis section 11 gets out from Loop L2, and returns True as the processing result. True indicates that the screen at the transition destination meets any of the screen identification conditions. In this case, the screen identification condition is the target identification condition in Step S207 in FIG. 10.

In the case where the screen information of the screen at the transition destination does not meet the target condition (No in S401), the dynamic analysis section 11 continues Loop L2. In the case where the screen information of the screen at the transition destination does not meet any screen identification condition, the dynamic analysis section 11 returns False as the processing result. False indicates that the screen at the transition destination does not meet any screen identification condition.

Figure 13:
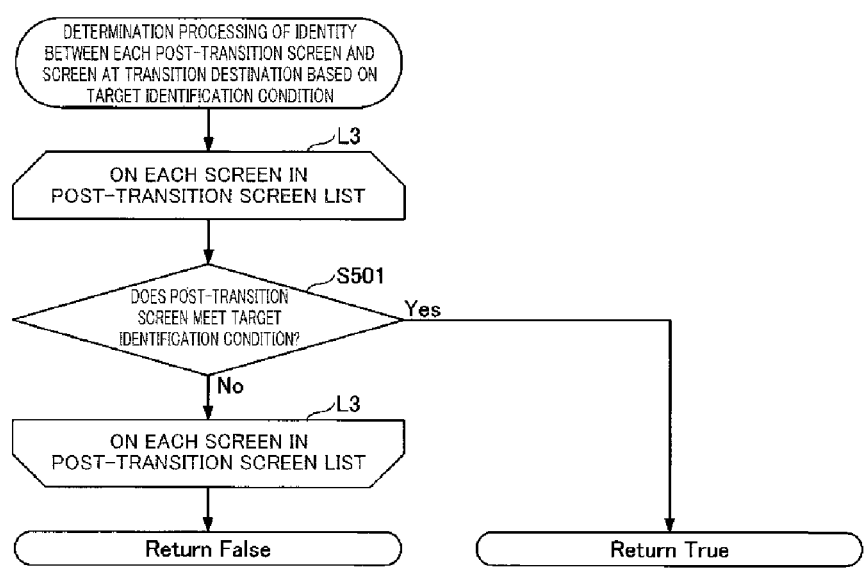
FIG. 13 is a flowchart for explaining an example of a processing procedure of determination processing of identity between each post-transition screen and the screen at the transition destination based on a target identification condition.

Subsequently, the detail of Step S207 in FIG. 10 will be described. FIG. 13 is a flowchart for explaining an example of the processing procedure of the determination processing of the identity between each post-transition screen and the screen at the transition destination based on the target identification condition. In FIG. 13, the individual post-transition screens included in the post-transition screen list serve as the processing targets successively one by one, and Loop L3 is executed. In Loop L3, Step S501 is executed.

In Step S501, the dynamic analysis section 11 determines whether or not screen data (hereinafter referred to as "target screen data") included in the screen information of the post-transition screen serving as the processing target meets the target identification condition. Herein, the target identification condition is the screen identification condition met by the screen data of the screen at the transition destination in FIG. 12. That is, in Step S501, it is determined whether or not the target screen data meets the screen identification condition met by the screen data of the screen at the transition destination.

In the case where the target screen data meets the target identification condition (Yes in S501), the dynamic analysis section 11 determines that the post-transition screen serving as the processing target and the screen at the transition destination are identical to each other, and returns True. On the other hand, in the case where the screen data of any of the post-transition screens does not meet the target identification condition (No in S502), the dynamic analysis section 11 determines that the screen at the transition destination is different from any of the post-transition screens, and returns False.

Herein, a specific description will be given of the case where the specification information which is restored first is the specification information shown in FIG. 8. In this case, in the processing procedure in FIG. 11 which is called in S105 in FIG. 6, the above-described assertion a1 is stored in the condition list storage section 15 as the screen identification condition.

As a result, in Step S204 (i.e., FIG. 12) of the dynamic analysis processing (FIG. 10) which is executed again, every time the screen transitions, it is determined whether or not the screen at the transition destination meets the screen identification condition. That is, it is determined whether or not the title of the screen at the transition destination matches "was not found" according to backward matching. In the example in FIG. 8, when the screen at the transition destination is the screen g3, it is determined that the screen at the transition destination meets the screen identification condition. Accordingly, the determination in Step S205 in FIG. 10 is Yes, and Step S207 (i.e., FIG. 13) is executed by using the screen identification condition as the target identification condition. Herein, suppose that the screen g2 in FIG. 8 is included in the post-transition screen list. The title of the screen g2 does not match "was not found" according to backward matching, and hence the screen g3 is determined to be different from the screen g2 in FIG. 13. Consequently, the determination in Step S208 in FIG. 10 is No, and the screen information of the screen g3 is added to the post-transition screen list. As a result, in Step S102 in FIG. 6 which is executed thereafter, specification information (screen transition diagram) in which a transition to the screen g3 is expressed as a transition different from a transition to the screen g2 is restored (generated). That is, the screen transition in the case where the search result is not present is restored.

On the other hand, a specific description will be given of the case where the specification information which is restored first is the specification information shown in FIG. 9. In this case, in the processing procedure in FIG. 11 which is called in S105 in FIG. 6, the above-described assertion a2 is stored in the condition list storage section 15 as the screen identification condition.

As a result, in Step S204 (i.e., FIG. 12) in the dynamic analysis processing (FIG. 10) which is executed again, every time the screen transitions, it is determined whether or not the screen at the transition destination meets the screen identification condition. That is, it is determined whether or not the title of the screen at the transition destination matches "was found" according to backward matching. In the example in FIG. 8, when the screen at the transition destination is each of the screens g2, g4, g5, and g6g6, it is determined that the screen at the transition destination meets the screen identification condition. Accordingly, in the case where each of the screens is the screen at the transition destination, the determination in Step S205 in FIG. 10 is Yes, and Step S207 (i.e., FIG. 13) is executed by using the screen identification condition as the target identification condition. Herein, suppose that the screens g2, g4, g5, and g6 transition in this order. In this case, in the case where the screen at the transition destination is the screen g2, the post-transition screen which meets the target identification condition is not included in the post-transition screen list. Consequently, the determination in Step S208 in FIG. 10 is No, and the screen information of the screen g2 is added to the post-transition screen list. On the other hand, in the case where the screen at the transition destination is the screen g4, g5, or g6, the screen g2 which meets the target identification condition is included in the post-transition screen list. Consequently, the determination in Step S208 in FIG. 10 is Yes, and the screen information of each of the screens g4, g5, and g6 is added to the identical screen list of the screen g2. As a result, in Step S102 in FIG. 6 which is executed thereafter, specification information (screen transition diagram) in which a transition to each of the screens g4, g5, and g6 is expressed as the transition identical to the transition to the screen g2 is restored (generated).

As described above, according to the present embodiment, it is possible to retain every screen at the transition destination including the screen determined to be identical to another screen during the dynamic analysis, present the result of the determination of screen identity to the user after the search is ended, and receive the condition for identifying the screen serving as the correction target from the user. As a result, in the re-executed dynamic analysis, it is possible to complement the determination of screen identity based on the condition. Consequently, it is possible to correct the error in the discrimination of screen identity with a small amount of operation and, by extension, it becomes possible to create a proper test script.

Note that the present embodiment may also be applied to screen transition of an application other than the Web application.

In the present embodiment, the specification analysis device 10 is an example of a screen discrimination device. The dynamic analysis section 11 is an example of each of a determination section and a re-determination section. The user assistance reception section 14 is an example of a reception section.

While the embodiment of the present invention has been described in detail thus far, the present invention is not limited to such a specific embodiment, and can be variously modified • changed within the spirit of the present invention described in the scope of claims.

REFERENCE SIGNS LIST

10 Specification analysis device
11 Dynamic analysis section
12 Specification restoration section
13 Script generation section
14 User assistance reception section
15 Condition list storage section
100 Drive device
101 Recording medium
102 Auxiliary storage device
103 Memory device
104 CPU
105 Interface device
106 Display device
107 Input device
B Bus

The invention claimed is:

1. A computer-implemented method for distinguishing aspects of screens of an application, the method comprising:
generating, based on automatic operations upon a first screen of the application, a second screen, the second screen transitioning from the first screen of the application in response to the automatic operations upon the first screen, wherein the automatic operation includes an input according to a predetermined script for testing the application;
determining, based on one or more conditions and the second screen, a difference between the second screen and at least one screen in a set of previously visited screens of the application associated with the automatic operations upon the first screen;
interactively modifying, based on the determined difference, the one or more conditions for modifying the determination of difference between the second screen and the at least one screen;
generating, based on the automatic operations upon the first screen of the application, a third screen, the third screen transitioning from the first screen of the application in response to the automatic operations upon the first screen, and wherein the third screen appears distinct from the second screen;
determining, based on the modified one or more conditions according to the second screen, a difference between the third screen and at least one screen in the set of previously visited screens;

updating, based on the determined difference between the third screen and the at least one screen, the set of previously visited screens; and causing determination of the third screen and the second screen being identical when the set of previously visited screens includes the second screen.

2. The computer-implemented method of claim 1, wherein the difference between the second screen and the at least one screen in the set of previously visited screens is based at least on textual content of the second screen.

3. The computer-implemented method of claim 1, wherein, when the third screen is distinct from all of the screens in the set of previously visited screens, the updated set of previously visited screens includes the third screen.

4. The computer-implemented method of claim 1, wherein the one or more conditions based on an URL, a DOM structure, a title of a screen, and a text string in the screen.

5. The computer-implemented method of claim 1, the method further comprising:
receiving the automatic operations on the first screen of the application.

6. The computer-implemented method of claim 1, the method further comprising:
updating, based on the first screen and the set of previously visited screens, specification information of the application.

7. The computer-implemented method of claim 1, the method further comprising:
generating, based at least on the updated set of previously visited screens, specification information of the application, wherein the specification information includes transition information of the screens.

8. A system for distinguishing aspects of screens, the system comprises:
a processor; and
a memory storing computer-executable instructions that when executed by the processor cause the system to:
generate, based on automatic operations on a first screen of an application, a second screen, the second screen transitioning from the first screen of the application in response to the automatic operations upon the first screen, wherein the automatic operation includes an input according to a predetermined script for testing the application;
determine, based on one or more conditions and the second screen, a difference between the second screen and at least one screen in a set of previously visited screens of the application associated with the automatic operations upon the first screen;
interactively modify, based on the determined difference, the one or more conditions for modifying the determination of difference between the second screen and the at least one screen;
generate, based on the automatic operations upon the first screen of the application, a third screen, the third screen transitioning from the first screen of the application in response to the automatic operations upon the first screen, and wherein the third screen appears distinct from the second screen;
determine, based on the modified one or more conditions according to the second screen, a difference between the third screen and at least one screen in the set of previously visited screens; and
update, based on the determined difference between the third screen and the at least one screen, the set of previously visited screens; and causing determination of the third screen and the second screen being identical when the set of previously visited screens includes the second screen.

9. The system of claim 8, wherein the difference between the second screen and the at least one screen in the set of previously visited screens is based at least on textual content of the second screen.

10. The system of claim 8, wherein, when the third screen is distinct from all of the screens in the set of previously visited screens, the updated set of previously visited screens includes the third screen.

11. The system of claim 8, wherein the one or more conditions based on an URL, a DOM structure, a title of a screen, and a text string in the screen.

12. The system of claim 10, the computer-executable instructions when executed further causing the system to:
receive the automatic operations on the first screen of the application.

13. The system of claim 10, the computer-executable instructions when executed further causing the system to:
update, based on the first screen and the set of previously visited screens, specification information of the application.

14. The system of claim 10, the computer-executable instructions when executed further causing the system to:
generate, based at least on the updated set of previously visited screens, specification information of the application, wherein the specification information includes transition information of the screens.

15. A computer-readable non-transitory recording medium storing computer-executable instructions that when executed by a processor cause a computer system to:
generate, based on automatic operations upon a first screen of an application, a second screen, the second screen transitioning from the first screen of the application in response to the automatic operations upon the first screen, wherein the automatic operation includes an input according to a predetermined script for testing the application;
determine, based on one or more conditions and the second screen, a difference between the second screen and at least one screen in a set of previously visited screens of the application associated with the automatic operations on the first screen;
interactively modify, based on the determined difference, the one or more conditions for modifying the determination of difference between the second screen and the at least one screen;
generate, based on the automatic operations on the first screen of the application, a third screen, the third screen transitioning from the first screen of the application in response to the automatic operations upon the first screen, wherein the third screen appears distinct from the second screen;
determine, based on the modified one or more conditions according to the second screen, a difference between the third screen and at least one screen in the set of previously visited screens;
update, based on the determined difference between the third screen and the at least one screen, the set of previously visited screens; and
causing determination of the third screen and the second screen being identical when the set of previously visited screens includes the second screen.

16. The computer-readable non-transitory recording medium of claim 15, wherein the difference between the second screen and the at least one screen in the set of previously visited screens is based at least on textual content of the second screen.

17. The computer-readable non-transitory recording medium of claim 15, wherein, when the third screen is distinct from all of screens in the set of previously visited screens, the updated set of previously visited screens includes the third screen.

18. The computer-readable non-transitory recording medium of claim 15, wherein the one or more conditions based on an URL, a DOM structure, a title of a screen, and a text string in the screen.

19. The computer-readable non-transitory recording medium of claim 15, the computer-executable instructions when executed further causing the system to:
   receive the automatic operations on the first screen of the application.

20. The computer-readable non-transitory recording medium of claim 15, the computer-executable instructions when executed further causing the system to:
   update, based on the first screen and the set of previously visited screens, specification information of the application; and
   generate, based at least on the updated set of previously visited screens, specification information of the application, wherein the specification information includes transition information of screens.

* * * * *